US007734842B2

(12) United States Patent
Arndt et al.

(10) Patent No.: US 7,734,842 B2
(45) Date of Patent: Jun. 8, 2010

(54) COMPUTER-IMPLEMENTED METHOD, APPARATUS, AND COMPUTER PROGRAM PRODUCT FOR MANAGING DMA WRITE PAGE FAULTS USING A POOL OF SUBSTITUTE PAGES

(75) Inventors: Richard Louis Arndt, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 11/390,790

(22) Filed: Mar. 28, 2006

(65) Prior Publication Data
US 2007/0260769 A1 Nov. 8, 2007

(51) Int. Cl.
G06F 13/28 (2006.01)
G06F 12/08 (2006.01)
(52) U.S. Cl. ......................................... 710/22; 711/139
(58) Field of Classification Search .................... 710/22
See application file for complete search history.

(56) References Cited

U.S. PATENT DOCUMENTS

| 4,277,826 | A |   | 7/1981 | Collins et al. |        |
|-----------|---|---|--------|----------------|--------|
| 4,868,738 | A |   | 9/1989 | Kish et al.    |        |
| 5,123,101 | A |   | 6/1992 | Sindhu         |        |
| 5,295,258 | A | * | 3/1994 | Jewett et al.  | 714/12 |
| 5,440,710 | A |   | 8/1995 | Richter et al. |        |
| 5,729,710 | A | * | 3/1998 | Magee et al.   | 711/203|
| 5,749,093 | A | * | 5/1998 | Kobayashi et al.| 711/139|
| 5,842,225 | A |   | 11/1998| Kohn           |        |
| 6,038,631 | A | * | 3/2000 | Suzuki et al.  | 710/260|
| 6,061,773 | A |   | 5/2000 | Harvey et al.  |        |
| RE37,305  | E |   | 7/2001 | Chang et al.   |        |
| 6,622,263 | B1|   | 9/2003 | Stiffler et al.|        |
| 6,745,306 | B1|   | 6/2004 | Willman et al. |        |
| 6,804,729 | B2| * | 10/2004| Swanberg       | 710/22 |

FOREIGN PATENT DOCUMENTS

JP 54023335 A 2/1979

OTHER PUBLICATIONS

Hoffman et al, "Page Replacement Algorithm", IBM Technical Disclosure Bulletin, vol. 15, No. 98, Jan. 1974, p. 2734.

* cited by examiner

*Primary Examiner*—Henry W. H. Tsai
*Assistant Examiner*—Titus Wong
(74) *Attorney, Agent, or Firm*—Yee & Associates, P.C.; Libby Z. Toub

(57) ABSTRACT

A computer-implemented method, apparatus, and computer program product are disclosed for managing direct memory access (DMA) write page faults using a pool of substitute pages. A computer system platform resolves a DMA write page fault for a page that is dedicated to an Input/Output (I/O) adapter. The I/O adapter attempts to write DMA data to the page. A determination is made that the page is unavailable for writing. The DMA data is then written to data locations in a substitute page that was selected from the pool of substitute pages. A flag is then set in a flag location for each one of the data locations. The flag locations correspond to the data locations. When a flag is set, the flag indicates that DMA write data is present in the data location that corresponds to that flag's flag location.

20 Claims, 6 Drawing Sheets

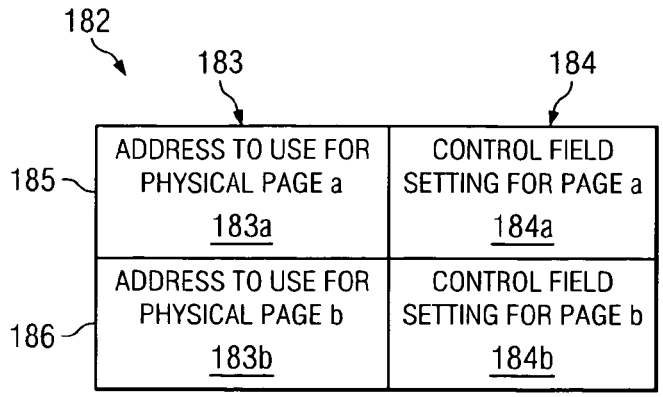

FIG. 1B

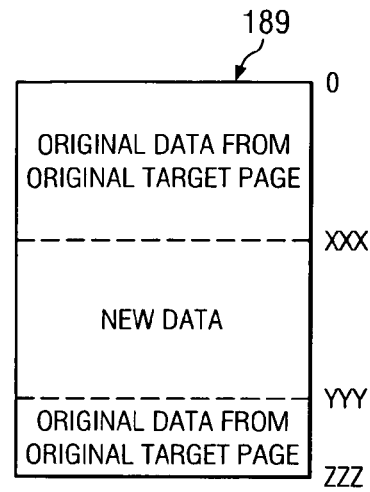

FIG. 1E

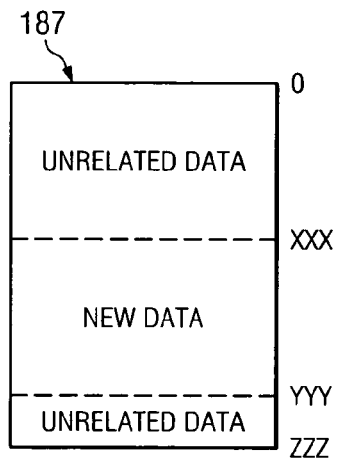

FIG. 1C

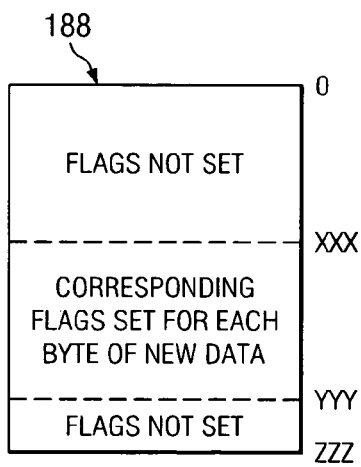

FIG. 1D

| FLAG LOCATION a | DATA LOCATION a |
| --- | --- |
| FLAG LOCATION b | DATA LOCATION b |
| FLAG LOCATION c | DATA LOCATION c |
| FLAG LOCATION d | DATA LOCATION d |
| FLAG LOCATION e | DATA LOCATION e |
| FLAG LOCATION f | DATA LOCATION f |
| FLAG LOCATION g | DATA LOCATION g |
| FLAG LOCATION h | DATA LOCATION h |
| FLAG LOCATION i | DATA LOCATION i |
| FLAG LOCATION j | DATA LOCATION j |
| FLAG LOCATION k | DATA LOCATION k |
| FLAG LOCATION l | DATA LOCATION l |
| FLAG LOCATION m | DATA LOCATION m |

FIG. 1F

COMPUTER-IMPLEMENTED METHOD, APPARATUS, AND COMPUTER PROGRAM PRODUCT FOR MANAGING DMA WRITE PAGE FAULTS USING A POOL OF SUBSTITUTE PAGES

BACKGROUND OF THE INVENTION

1. Field of the Invention

The preferred embodiment relates generally to data processing systems and, more specifically, to a computer-implemented method, apparatus, and computer program product for managing DMA write page faults using a pool of substitute write buffer pages.

2. Description of the Related Art

According to a trend in computer systems, a system can be reconfigured while running without disrupting data processing. For example, with multiple operating systems running on the computer, while a first one of the operating systems is using a particular block of memory there can arise a need to reallocate the block of memory for use by a second one of the operating systems. In this case, the first operating system must first stop using the block of physical memory before the memory can be reallocated. Or, for example, a problem may be detected in a block of physical memory, in which case it may be desirable to remove the memory from operation so that it can be replaced. Once again, whatever operating system was using the block of memory must stop using it.

In certain respects it is relatively straightforward to stop using one block of physical memory and start using another, since mechanisms related to virtual memory management already exist in conventional operating systems to handle aspects of this problem that relate to operating system access to this memory. But these mechanisms depend upon the block of memory being used for only program data that is subject to access by operating systems and that is not subject to access by I/O devices. If the block of memory is subject to access by I/O devices the problem is more difficult. This access by I/O devices is commonly direct memory access (DMA), although this may not always be the case.

Blocks of memory subject to access by an I/O device, through the I/O device's I/O adapter, are conventionally "pinned," that is, exempted from being moved because access to them is restricted by essentially endless I/O programs that run as long as the operating system runs. It is disruptive to the system to stop such an I/O program that pins memory. By pinning these blocks of memory, the blocks of memory are essentially dedicated for use by the I/O device that has pinned the memory. One or more individual blocks of memory can be reserved, by being pinned, for use by a particular individual I/O device.

Pinning blocks of memory, however, is not particularly efficient for the computer system that includes the I/O device that has pinned memory for its use. These blocks of memory are typically underutilized. Although an I/O device may at some point need to use its pinned memory by writing to that memory, the memory often sits unused.

SUMMARY OF THE INVENTION

A computer-implemented method, apparatus, and computer program product are disclosed for managing DMA write page faults using a pool of substitute pages. The computer system's platform resolves a DMA write page fault for a page that is dedicated to an I/O adapter. The I/O adapter attempts to write DMA data to the page. A determination is made that the page is unavailable for writing. The DMA data is then written to data locations in a substitute page that was selected from the pool of substitute pages. A flag is then set in a flag location for each one of the data locations into which data was written. The flag locations correspond to the data locations into which data was written. When a flag is set, the flag indicates that DMA write data is present in the data location that corresponds to that flag's flag location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1B illustrates a portion of an address validation and translation table that includes a control field for each entry in accordance with the illustrative embodiment of the present invention;

FIG. 1C depicts a substitute data page used for storing DMA write data in accordance with the illustrative embodiment of the present invention;

FIG. 1D depicts a substitute flag page used for storing flags in accordance with the illustrative embodiment of the present invention;

FIG. 1E depicts a restoration page used for integrating the original data that was stored in the original target page with the DMA write data in accordance with the illustrative embodiment of the present invention;

FIG. 1F depicts a substitute page that includes both data locations and flag locations in accordance with the illustrative embodiment of the present invention;

DETAILED DESCRIPTION OF THE PREFERRED EMBODIMENT

Figure 1A:
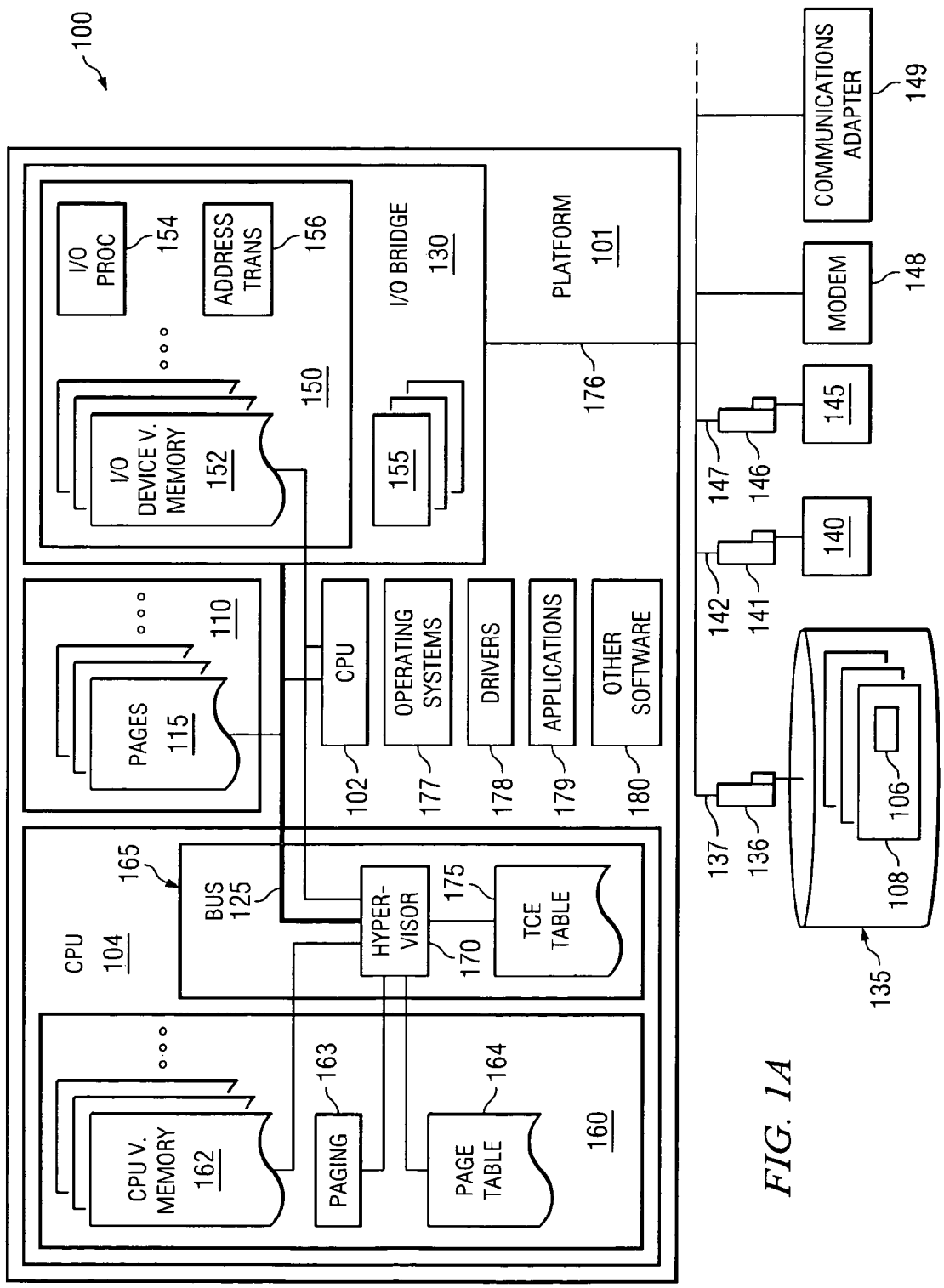
FIG. 1A depicts a computer system that includes the illustrative embodiment of the present invention.

The illustrative embodiment of the present invention is a computer-implemented method, apparatus, and computer program product for permitting the computer system's platform to resolve I/O write page faults, such as DMA write page faults, for pages that are dedicated to I/O devices through those devices' I/O adapters. Because the platform is capable of resolving I/O write page faults, the platform can temporarily use a page that is dedicated to an I/O adapter for other purposes until the I/O adapter needs to write to its page.

The platform's I/O subsystem provides temporary substitute pages for DMA write data that is intended to be stored in a target page that has been paged out by the virtual memory subsystem. The temporary substitute pages incorporate per byte usage indicators, referred to herein as flags, that are used when the DMA write data is reintegrated with the restored paged out data by the virtual memory subsystem.

A DMA write page fault occurs when an I/O device, through its I/O adapter, is attempting to write DMA data to a particular target page and the I/O device cannot find the target page in virtual memory. When a DMA write page fault occurs, the platform stores the write data in data locations in a substitute page as if the substitute page were the original target page. The data locations in the substitute page correspond to the locations in the original target page where the data would have been stored had the original target page not been paged out from virtual memory.

Flags are then set in particular flag locations. These particular flag locations correspond to the data locations where the DMA write data is stored in the substitute page.

In one embodiment, a single substitute page is used and includes both the data locations and flag locations. The DMA write data is stored in particular ones of these data locations. Flags, stored in this same substitute page, are then set. The flags that are set are the flags that are stored in the flag locations that correspond to the data locations where the DMA write data is stored. The flags in the remaining flag locations are not set.

In another embodiment, two substitute pages are used. The first substitute page includes only data locations while a second substitute page includes only flag locations. The DMA write data is stored in particular ones of the data locations in the first substitute page. Flags are then set in the second substitute page. Each flag location in the second substitute page corresponds to a data location in the first substitute page. Flags that are stored in flag locations in the second page that correspond to the data locations in the first page where the DMA write data is stored are set.

If a flag is set in a particular flag location, its corresponding data location contains valid DMA write data. If a flag is not set in a particular flag location, its corresponding data location does not contain valid DMA write data.

The substitute pages are temporary pages. When the original target page is once again located in memory and is no longer paged out, the DMA write data can then be reintegrated with the data that was stored in the original target page at the time of the DMA write. The data and flags are used to restore the DMA write data. The flags are used to determine which data locations contain the DMA write data. Once the DMA write data is located, it is then reintegrated with the data from the original target page to create a restored page.

The computer system typically includes an address validation and translation table that is used to associate physical pages with particular I/O adapters. Each entry in the table is associated with a particular physical page. This table is indexed using the address of a DMA operation. The illustrative embodiment of the present invention adds a control field to this table. The control field is used to indicate a current status for each physical page.

The computer system's platform includes I/O translation software that uses the address validation and translation table when performing I/O operations. According to the illustrative embodiment of the present invention, the I/O translation software also maintains a list of substitute pages that are used as described herein. Any form of list can be used, such as linked lists, multilevel tables, queues, or any other suitable type of list. This list forms a pool of available substitute pages.

When substitute pages are needed, the I/O translation hardware selects pages from this list. When the number of substitute pages included in the list falls below a predetermined threshold, an interrupt is generated. In the illustrative embodiment, the interrupt is generated by hardware, such as the I/O translation hardware or mechanism. The platform's memory virtualization software then responds to the interrupt by allocating additional pages that can be used as substitute pages.

For each entry in the address validation and translation table, the control field setting is used to indicate the current status of the physical page that is associated with the entry. A first control field setting indicates that normal DMA write processing can occur to the physical page. In this case, the target physical page is located in memory and is not paged out.

A second control field setting indicates that DMA write processing must be held. This setting is used when the physical page had been paged out and substitute pages were used. In this case, the substitute pages for this physical page are in the process of being reintegrated with the data of the original target page.

A third control field setting indicates that substitute pages must be obtained prior to executing a DMA write. In this case, the physical page is paged out, and substitute pages have not already been selected that will be used to temporarily store the DMA write data. If a single substitute page is used that includes both data and flag locations, once substitute pages are selected, the address of the substitute page is stored in the entry in the address validation and translation table that is associated with the target page. If two substitute pages are used, once the substitute pages are selected, the address of a descriptor that contains the addresses of the substitute pages is stored in the entry in the address validation and translation table that is associated with the target page.

A fourth control field setting indicates that the DMA write can be processed but must be processed to the selected substitute page(s) instead of to the target page. When the control field setting is the fourth setting, after DMA write data is stored in the appropriate data locations, the flags in the corresponding flag locations are set. All other flags in the remaining flag locations in the page remain not set.

When the platform's memory virtualization software decides to expropriate a page that is the target for DMA writes, i.e. the page will be paged out, the platform's memory virtualization software sets the control field in this page's entry in the address validation and translation page to the third setting. The platform's memory virtualization software then clears the address field of the entry.

If this page subsequently becomes the target of a DMA write operation prior to the page being restored, the platform's I/O translation hardware/mechanism finds that the control field setting is the third setting. Because the setting is the third setting, the platform's I/O translation hardware/mechanism selects substitute pages from its list of substitute pages. The I/O translation hardware then enters the address of the substitute page that includes the data locations into the address field of the address validation and translation table. The I/O translation hardware/mechanism also sets the control field to the fourth setting. The DMA write data is then written to particular data locations. Flags are set in the flag locations that correspond to the data locations where the DMA write data was stored.

When the original target page is again located in memory and is no longer paged out, the data, currently stored in a substitute page, can be retrieved and reintegrated with the data currently stored in the original target page. When the reintegration process is begun, the virtual memory software sets the control field for the entry for this particular physical page to the third setting in order to avoid an endless sequence of substitution page writes. The third setting causes the processing of other DMA writes to be postponed during this reintegration process.

A substitute page is then selected to use as a restoration page. The data from the particular data locations is then stored in locations in the restoration page that correspond to the data locations. The flags are used to identify which data locations are the particular locations that contain valid DMA write data. The address of this restoration page is then stored in the address field in the address validation and translation table entry.

At this time the page is once again in virtual memory and can be used for normal DMA write processing. Therefore, the control field for this entry is set to the first setting.

As those skilled in the art will recognize, the physical sizes of the fields in the substitute pages may be sized to optimize storage cell utilization without affecting the novelty of the illustrative embodiment of the present invention. While in most cases the data location must be writable at the byte level to match the characteristics of most I/O buses, other granularity could be used provided they match the characteristics of the DMA generating device.

Further, the flag location could contain information for only a single data location byte or it could contain information for multiple bytes.

Although the memory virtualization software and I/O translation hardware/mechanisms are described above performing particular functions, any suitable platform software could perform the functions described above.

FIG. 1A depicts a computer system 100 that includes the illustrative embodiment of the present invention. Computer system 100 includes a platform 101. Computer system 100 may be a symmetric multiprocessor (SMP) system including a plurality of processors 102 and 104. Alternatively, a single-processor system may be employed.

In the system 100, data 106, which includes instructions, is stored in nonvolatile memory, e.g., disk storage 135, and blocks 108 of the data 106 are written from the nonvolatile memory to the volatile memory 110. As concerns their actual physical location in the volatile memory, the blocks 108 of data 106 are referred to as "physical pages" 115 of data, to distinguish from references to the data 106 having the viewpoint of a virtual memory mapping. The volatile memory 110 is therefore also sometimes referred to as "physical memory."

With the blocks of data in volatile memory 110, they are accessible by I/O devices 135, 140, 145, and a central processing unit ("CPU") 104 of the system 100. As used herein, the term "I/O device" refers to any of a variety of devices which interface to the computer system 100 and provide information to the system or receive information from the system. Examples of I/O devices include a memory, such as nonvolatile disk storage 135, a mouse, a track ball, touch pad or the like, a keyboard, a display, a printer, a camera, a modem, an optical scanner, a microphone, an audio speaker.

More specifically, the physical pages 115 are coupled by a first bus 125 to an I/O bridge 130 and each of the I/O devices 135 is coupled to the I/O bridge 130 by a corresponding I/O adapter 136, 141, 146 and segment 137, 142 of an I/O bus 176.

Communications links to other computers may be provided through a modem 148 and/or communications adapter 149.

The I/O bridge 130 also has logic 150, including bus logic that arbitrates among the I/O devices 135, that is, that grants the I/O devices access one at a time to the I/O bus 176, and from the I/O bus 176 to the first bus 125. The I/O bridge 130 also includes I/O data buffers 155 for caching data 106 from a physical page 115 or an I/O device, such as nonvolatile memory 135, responsive to requests by the I/O devices, and the logic 150 includes logic that handles the data buffering. In the illustrative embodiment, the I/O bridge logic 150 includes an I/O processor 154.

CPU 104 executes operating system and firmware instructions, images of which are represented in FIG. 1 in the CPU as operating system 160 and firmware 165. Instructions for execution by the CPU 104 include firmware instructions 165, operating system instructions 160 that run with the support of the firmware 165, and application instructions (not shown) that run with the support of the firmware 165 and operating system 160. It should be appreciated that the firmware 165 runs on the processor 104 substantially independently of the operating system 160 and provides a lower level of interface and therefore greater access to hardware components such as processor 104 than does the operating system 160. In certain respects, the operating system 160 presents applications running on the CPU 104 a view of the blocks 108 of data 106 as pages of virtual memory 162 so that the actual location of the data 106 is fairly transparent, regardless of whether the data is in volatile memory 110 or on disk storage 135, for example. Accordingly, the operating system 160 includes a paging mechanism 163 and page table 164 for somewhat transparently moving data 106 in and out of volatile memory 110.

Concerning the I/O device virtual memory 152, the operating system 160 directs the I/O logic 150 to map blocks 108 of data 106 to the physical pages 115 via entries in a translation control entry ("TCE") table 175. In the embodiment illustrated, firmware 165 provides services that are put to use for moving data from a first one of the physical pages 115 to a second one of the physical pages 115, so that the first page can be put to a different service or idled. To do this, the operating system 160 finds a set of one or more entries for the first one of the physical pages 115 in the TCE table 175. Then the operating system 160 directs a firmware 165 component, i.e., Hypervisor 170, to copy the data from the first physical page 115 associated with a given I/O device virtual memory page 152 to the second physical page 115, then change the associated mapping in the TCE Table 175 such that future accesses to I/O device virtual memory page 152 are directed to the second physical page. Hypervisor 170 has a number of functions including, among others, keeping the TCE table 175 updated, and maintaining memory coherency with respect to I/O operations.

Physical pages of memory are subject to access by input/output ("I/O") adapters. TCE table 175 includes entries that associate the physical pages with the I/O adapters. Each entry associates a particular physical page with a particular I/O adapter.

To understand the TCE table 175, consider that I/O devices 135 have their own view of data 106 as pages of virtual memory 152, similar to the virtual memory view of the CPU 104. The I/O bridge logic 150 presents this view to the I/O devices 135. In other embodiments, the I/O processor 154 and firmware 165 presents this view to the I/O devices 135. To maintain this view, the entries (not shown in FIG. 1) in the TCE table 175 map the blocks 108 of data 106 to the I/O virtual memory pages 152. Accordingly, I/O devices 135 may refer to the data 106 by reference to the virtual page 152 regardless of the actual location of the data, that is, regardless of which physical page 115 may be currently storing the data.

I/O bridge 130 provides logic 150 that lies between bus 125 and bus 176. Memory requests on bus 176 come in from I/O devices with virtual addresses to reflect I/O device virtual memory 152. I/O translation hardware (address translation logic) 156 effectively accesses TCE Table 175 (which is kept in I/O device virtual page order) to determine the physical page address that it should apply to bus 125 in order to access the correct physical page 115 associated with the memory request from bus 176. (Above, the term "effectively" is used because in reality the logic 150 contains cached copies of the relevant sections of the TCE table 175 so that the process is sped up.)

TCE table 175 is an I/O address validation and translation table that is indexed by the I/O bus address of DMA operations. This table is used to ensure that the I/O adapter is accessing only the storage locations that it has been assigned, and to allow the platform software to relocate the physical storage blocks relative to the DMA address contained in the I/O commands generated by the I/O adapter's device driver.

Platform 101 includes hardware, as described above, and also includes operating systems 177, drivers 178, applications 179, and other software 180.

FIG. 1B illustrates a portion of an address validation and translation table, also referred to as a TCE table, which includes a control field for each entry in accordance with an illustrative embodiment of the present invention. Table 182 includes an address field 183 and a control field 184 for each physical page. According to the illustrative embodiment of the present invention, an additional field, i.e. field 184, is added to TCE table 175, as depicted in FIG. 1A.

For example, entry 185 includes an address to use to access physical page "a" and a current control setting for physical page "a". The address to use to access physical page "a" is stored in field 183a of entry 185. The current control setting for physical page "a" is stored in field 184a.

Entry 186 includes an address to use to access physical page "b" and a current control setting for physical page "b". The address to use to access physical page "b" is stored in field 183b of entry 186. The current control setting for physical page "b" is stored in field 184b.

FIG. 1C depicts a substitute data page 187 used for storing DMA write data in accordance with the illustrative embodiment of the present invention. The DMA write data was targeted to be stored in the original target page in data locations, from location XXX to location YYY in the page. Therefore, this DMA write data is stored in the substitute page 187 in data locations, from location XXX to location YYY. Data locations from location 0 to location XXX and from location YYY to location zzz contain either no data or unrelated data.

FIG. 1D depicts a substitute flag page 188 used for storing flags in accordance with the illustrative embodiment of the present invention. Flag page 188 includes flag locations 0 through ZZZ. Each flag location in flag page 188 has a corresponding data location in data page 187.

A flag is stored in each flag location. If a flag in a particular flag location is set, the data location in the data page that corresponds to that flag location is valid DMA write data that will need to be restored. If a flag in a particular flag location is not set, the data in the data location that corresponds to that flag location is not valid DMA write data and should be ignored.

Therefore, the flags in locations 0 to XXX and from YYY to ZZZ are not set, while the flags in locations XXX to YYY are set.

FIG. 1E depicts a restoration page 189 used for integrating the original data, which was stored in the original target page at the time of the DMA write, with the DMA write data in accordance with the illustrative embodiment of the present invention. The original data is retrieved from the original target page and is copied to the data locations in the restoration page 189 that correspond to their original locations in the original target page.

The DMA write data is then retrieved from data page 187 and overlaid over the original data using the flags from flag page 188. The process of overlaying the DMA write data is completed by determining, for each location in flag page 188, whether the flag in that location is set. If the flag is set, the data that is stored in the corresponding data location in the data page is stored in the corresponding location in the restoration page. If the flag is not set, any data that might be stored in the corresponding data location in the data page is ignored and is not stored in the corresponding location in the restoration page.

FIG. 1F depicts a single substitute page 190 that includes both data locations and flag locations in accordance with the illustrative embodiment of the present invention. As depicted in FIG. 1F, flag locations and data locations are alternated throughout page 190. Thus, the first location in page 190 is flag location "a". The next location is data location "a", which corresponds to flag location "a". Single substitute page 190 can be used in place of substitute pages 187 and 188.

Substitute page 190 is used in a manner as described above. The process of overlaying the DMA write data is completed by determining whether a flag is set for each flag location in page 190. If a flag is set in a flag location, the data that is stored in the corresponding data location is stored in the corresponding location in the restoration page. If a flag is not set, any data that might be stored in the corresponding data location is ignored and is not stored in the corresponding location in the restoration page.

Figure 2A:
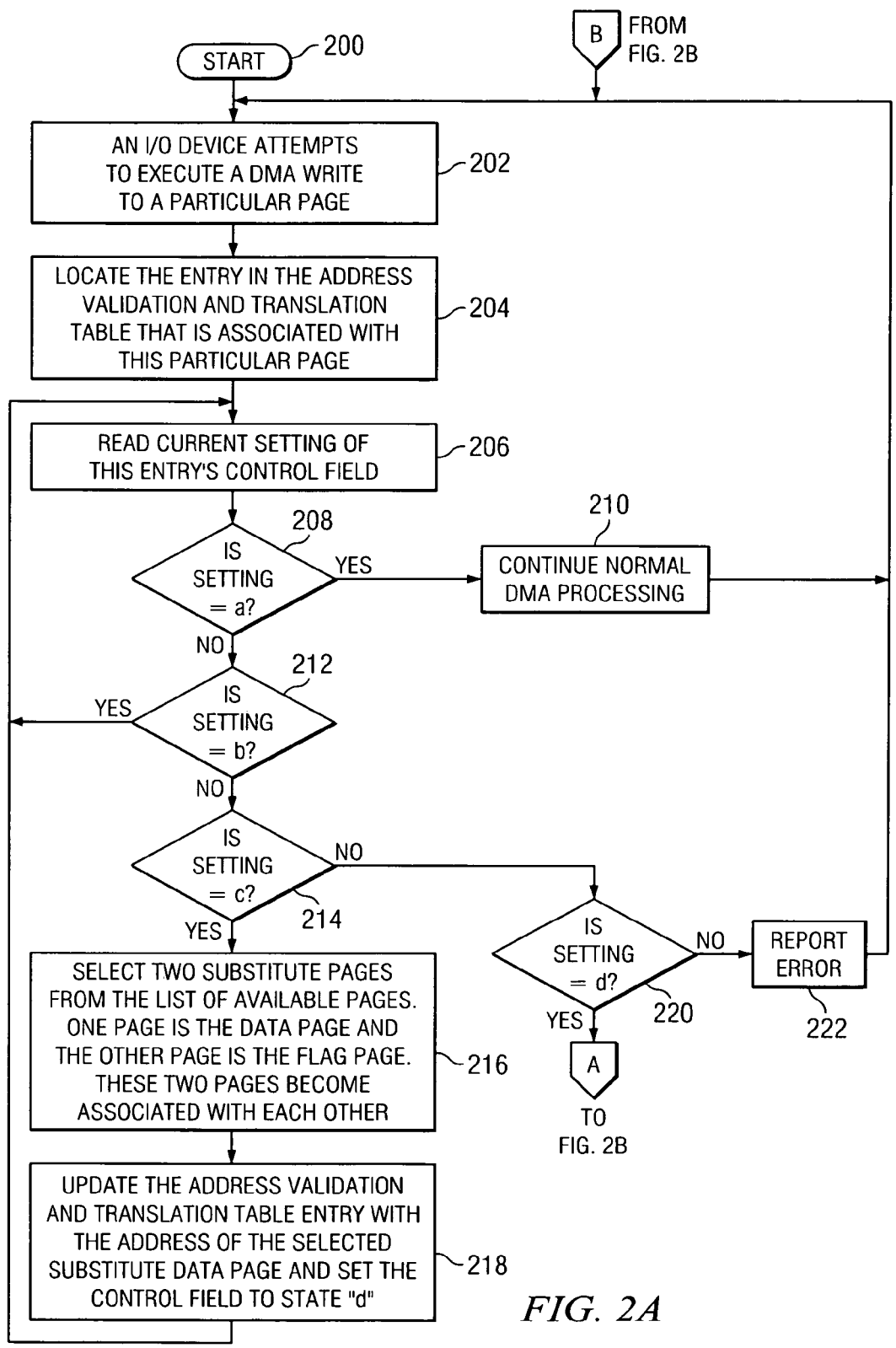
FIGS. 2A and 2B together depict a high level flow chart that illustrates utilizing a control setting to determine how to execute a DMA write and utilizing substitute pages when the original target page is paged out in accordance with the illustrative embodiment of the present invention.
Figure 2B:
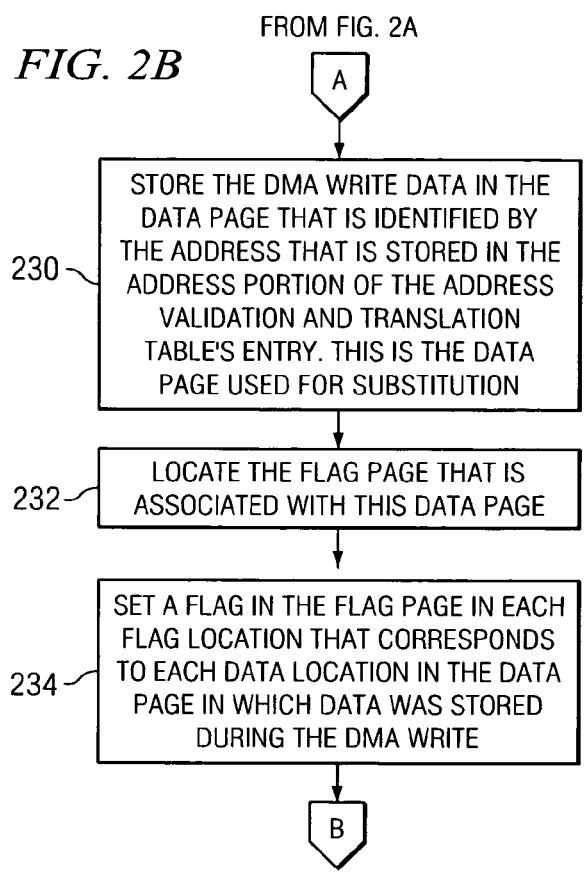

FIGS. 2A and 2B together depict a high level flow chart that illustrates utilizing a control setting to determine how to execute a DMA write and utilizing substitute pages when the original target page is paged out in accordance with the illustrative embodiment of the present invention. The process starts as depicted by block 200 and thereafter passes to block 202 which illustrates an I/O device attempting to execute a DMA write to a particular target page.

Next, block 204 depicts locating, in the address validation and translation table, the entry that is associated with this particular page. The address validation and translation table is preferably located in the main storage although it may be located in the memory controller, I/O bridge, PCI bus bridges, I/O adapters, or the like.

Block 206 then illustrates reading the current setting of this entry's control field. The process then passes to block 208 which depicts a determination of whether or not the control field setting is "a". Control field setting "a" is the first control field setting. If a determination is made that the control field setting is "a", the process passes to block 210 which illustrates continuing normal DMA processing. The process then passes back to block 202.

Referring again to block 208, if a determination is made that the control field setting is not "a", the process passes to block 212 which depicts a determination of whether or not the control field setting is "b". Control field setting "b" is the second control field setting. If a determination is made that the control field setting is "b", the process passes back to block 206.

Referring again to block 212, if a determination is made that the control field setting is not "b", the process passes to block 214 which illustrates a determination of whether or not the control field setting is "c". Control field setting "c" is the third control field setting. If a determination is made that the control field setting is "c", the process passes to block 216 which illustrates selecting two substitute pages from a list of available substitute pages. One page will be the data substitute page and the other page will be the flag substitute page. These two pages become associated with each other.

One way to associate the two pages is to have them be two consecutive pages in real memory. Usually this is done with even/odd address pairs.

There are several approaches to configuring these pages. In one approach, the even page contains the DMA data while the odd page contains the flags.

Instead of using two separate pages, a single substitute page can be used that includes both the data and the flags. For example, DMA byte 0 goes into byte 0, i.e. the first byte, of the first page and its corresponding flag byte goes into byte 1 of the first page. This continues with the $2048^{th}$ flag byte being in the second byte of the second page. Several other mappings between the DMA and corresponding flag bytes are possible and readily apparent to those of ordinary skill in the art.

Next, block 218 depicts updating the address validation and translation table entry with the address of the selected data substitute page that includes the data locations and setting the control field to "d". The process then passes to block 206.

Referring again to block 214, if a determination is made that the control field setting is not "c", the process passes to block 220 which illustrates a determination of whether or not the control field setting is "d". Control field setting "d" is the fourth control field setting. If a determination is made that the control field setting is "d", the process passes to block 230 as illustrated by connector A.

Block 230 depicts storing the DMA write data in the data page that is identified by the address that is stored in the address portion of the address validation and translation table's entry. Next, block 232 illustrates locating the flag page that is associated with this data page. Thereafter, block 234 depicts setting a flag in the flag page in each flag location that corresponds to each data location in the data page in which data was stored during the DMA write. The process then passes back to block 202 as illustrated by connector B.

Referring again to block 220, if a determination is made that the control field setting is not "d", the process passes to block 222 which depicts reporting an error. The process then passes back to block 202.

Figure 3:
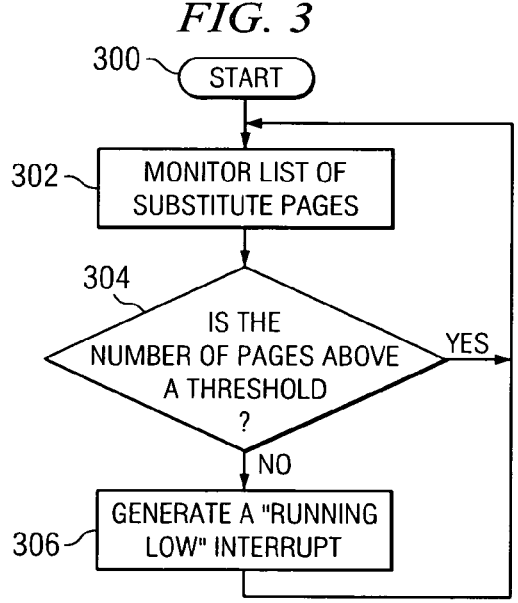
FIG. 3 depicts a high level flow chart that illustrates generating an interrupt when the number of available substitute pages falls below a predetermined threshold in accordance with the illustrative embodiment of the present invention.

FIG. 3 depicts a high level flow chart that illustrates generating an interrupt when the number of available substitute pages falls below a predetermined threshold in accordance with the illustrative embodiment of the present invention. The process starts as depicted by block 300 and thereafter passes to block 302 which depicts monitoring a list, i.e. a pool, of substitute pages. These listed pages are available to be used as substitute pages. Next, block 304 illustrates a determination of whether or not the number of pages in the list is above a predetermined threshold. If a determination is made that the number of listed substitution pages is above the threshold, the process passes back to block 302. If a determination is made that the number of listed substitute pages is not above a threshold, the process passes to block 306 which depicts generating a "running low" interrupt. The process then passes back to block 302.

Figure 4:
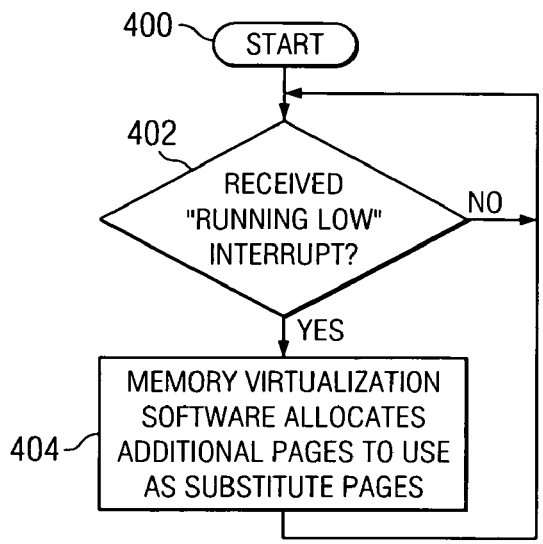
FIG. 4 depicts a high level flow chart that illustrates allocating additional substitute pages in accordance with the illustrative embodiment of the present invention.

FIG. 4 depicts a high level flow chart that illustrates allocating additional substitute pages in accordance with the illustrative embodiment of the present invention. The process starts as depicted by block 400 and thereafter passes to block 402 which illustrates a determination of whether or not the memory virtualization software has received a "running low" interrupt. If a determination is made that the memory virtualization software has not received a "running low" interrupt, the process passes back to block 402. If a determination is made that the memory virtualization software has received a "running low" interrupt, the process passes to block 404 which illustrates the memory virtualization software allocating additional pages to use as substitute pages. These newly allocated pages are then listed as available substitute pages and, thus, become part of the pool of available substitute pages. The process then passes back to block 402.

Figure 5:
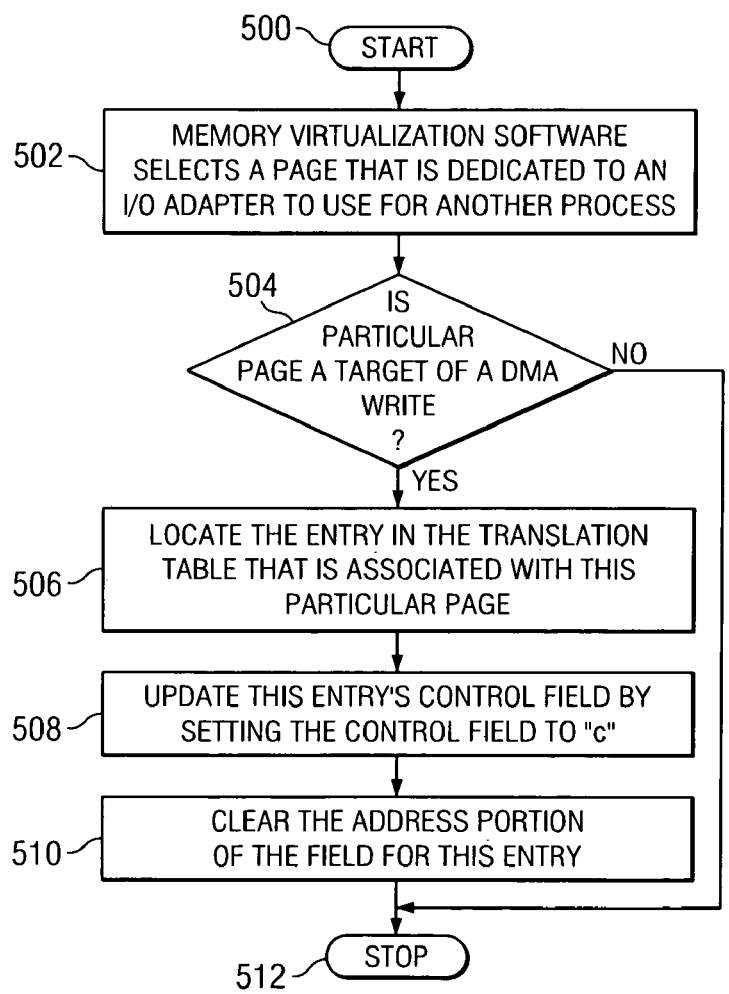
FIG. 5 depicts a high level flow chart that illustrates the platform updating an address validation and translation table entry for a physical page that has been paged out in accordance with the illustrative embodiment of the present invention.

FIG. 5 depicts a high level flow chart that illustrates the platform updating an entry for a physical page that has been paged out in accordance with an illustrative embodiment of the present invention. The process starts as depicted by block 500 and thereafter passes to block 502 which illustrates the memory virtualization software selecting a page that is dedicated to an I/O adapter to use for another process. Next, block 504 depicts a determination of whether or not the particular page is a target of a DMA write. The memory virtualization software checks the address validation and translation tables that are used to validate all DMA operations to determine whether this particular page is a target of a DMA write. The address validation and translation tables contain the addresses of all pages that may be targets of DMA operations along with the write permission flags.

Referring again to block 504, if a determination is made that the particular page is not a target of a DMA write, the process terminates as depicted by block 512. If a determination is made that the particular page is a target of a DMA write, the process passes to block 506 which illustrates locating the entry in the address validation and translation table that is associated with this particular page.

Next, block, 508 depicts updating the control field for this entry by setting the control field to "c". Thereafter, block 510 illustrates clearing the address portion of the field for this entry. The process then terminates as depicted by block 512.

Figure 6:
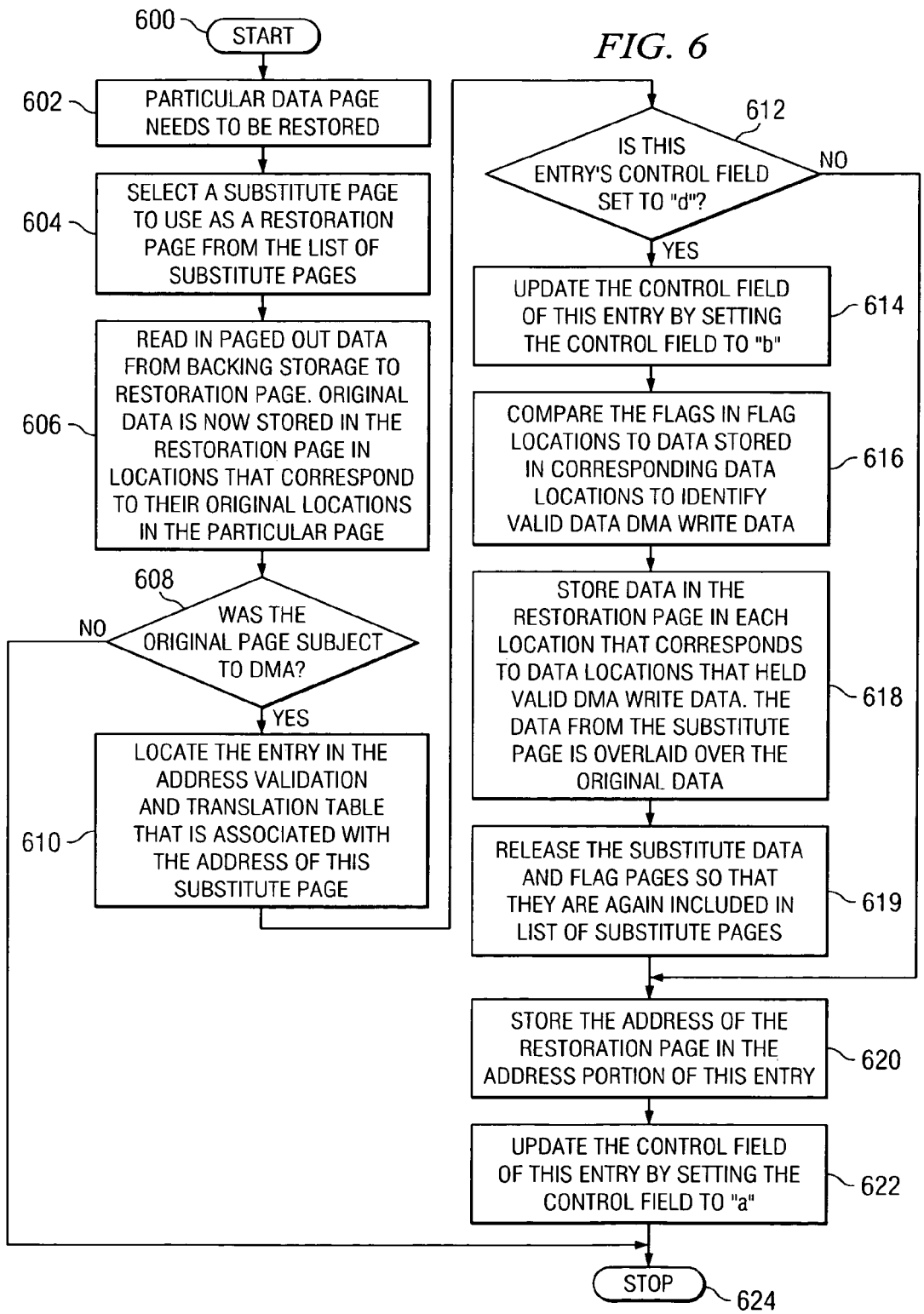
FIG. 6 depicts a high level flow chart that illustrates reintegrating data from data locations in a substitute page with data from the original target page to form a restored page in accordance with the illustrative embodiment of the present invention.

FIG. 6 depicts a high level flow chart that illustrates reintegrating data from data locations in a substitute page with data from the original target page to form a restored page in accordance with the illustrative embodiment of the present invention.

The process starts as depicted by block 600 and thereafter passes to block 602 which illustrates a particular page needing to be restored. A page needs to be restored, for example, when the I/O operation that was writing to the page completes. The I/O adapter that was doing the writing sends an interrupt to its controlling operating system. The end user that requested the original I/O is ultimately notified that the operation is complete. When the end user attempts to access the data in the page, the attempted access will cause a page fault since the virtual memory page is not physically in main storage. This then triggers the need to restore the page.

Next, block 604 depicts selecting, from the list of substitute pages, a substitute page to use as a restoration page. Then, block 606 illustrates reading in the paged out data from backing storage to the substitute page being used as the restoration page. Thus, the data that was stored in the original target page at the time of the DMA write is now stored in the restoration page. This data is stored in the restoration page in locations that correspond to the locations in which the data was stored in the original target page.

The backing storage is where the original data was stored when the original target page was paged out. The original data is now stored in the restoration page in their original data locations. Thus, at this time, the restoration page is identical to the original page as it existed just prior to being paged out.

The process then passes to block 608 which depicts a determination of whether or not the original page was a target of a DMA write. If a determination is made that the original page was not a target of a DMA write, the process terminates as illustrated by block 624. Referring again to block 608, if a determination is made that the original page was a target of a DMA write, the process passes to block 610 which depicts locating the entry in the address validation and translation table that is associated with the address of this substitute page.

Next, block 612 illustrates a determination of whether or not the control field for this entry is set to "d". This is a determination of whether or not a DMA write was processed to the original page while the original page was paged out. If a DMA write was processed, the data was written into a substitute data page instead of to the intended original DMA page. If a determination is made that the control field is not set to "d", i.e. no DMA write was processed to the original page while the original page was paged out, the process passes to block 620. If a determination is made that the control field is set to "d", i.e. a DMA write was processed to the original page while the original page was paged out, the process passes to block 614 which depicts updating the control field of this entry by setting the control field to "b". Thereafter, block 616 illustrates comparing the flags stored in the flag locations to the data that is stored in corresponding data locations to identify valid DMA write data.

The process then passes to block 618 which depicts storing data in the restoration page in each location that corresponds to the data locations where valid DMA write data was stored. In this manner, data from the substitute page is overlaid over the original data. The process then passes to block 619 which illustrates releasing the substitute data and flag pages so that they are once again included in the list of substitute pages. In this manner, these released pages again become part of the pool of substitute pages. Block 620, then, illustrates storing the address of the restoration page in the address portion of this entry. Next, block 622 depicts updating the control entry field of this entry by setting the control field to "a". The process then terminates as illustrated by block 624.

The invention can take the form of an entirely hardware embodiment, an entirely software embodiment or an embodiment containing both hardware and software elements. In a preferred embodiment, the invention is implemented in a combination of hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for resolving a direct memory access (DMA) write page fault for a page that is dedicated to an Input/Output (I/O) adapter, said page dedicated to remain available for use by said I/O adapter, said computer-implemented method comprising:

attempting, by said I/O adapter, to write DMA data to said page;

responsive to said I/O adapter attempting to write DMA data to said page, identifying a particular entry in an address validation and translation table that is associated with said page, wherein each entry in the address validation and translation table includes an address field in which is stored an address and a control field in which is stored a current control setting;

reading the current control setting that is associated with said page from said particular entry, in response to reading the current control setting, processing said attempt to write DMA data to said page according to said current control setting; and responsive to a DMA write fault occurring while processing said attempt:

writing said DMA data to only a subset of all data locations included in a substitute page, wherein said subset of data locations includes fewer than all data locations included in said substitute page, and further wherein said substitute page and said page include the same number of data locations; and setting a flag in a flag location that corresponds to each one of said subset of data locations, wherein the flag indicates that DMA write data is present in each one of said subset of data locations.

2. A computer program product that is stored in a computer-readable medium that includes program code, which when executed, performs the action of:

attempting, by said I/O adapter, to write DMA data to said page;

responsive to said I/O adapter attempting to write DMA data to said page, identifying a particular entry in an address validation and translation table that is associated with said page, wherein each entry in the address validation and translation table includes an address field in which is stored storing an address and a control field in which is stored a current control setting;
reading the current control setting that is associated with said page from said particular entry;
in response to reading the current control setting, processing said attempt to write DMA data to said page according to said current control setting; and
responsive to a DMA write fault occurring while processing said attempt:
writing said DMA data to only a subset of all data locations included in a substitute page, wherein said subset of data locations includes fewer than all data locations included in said substitute page, and further wherein said substitute page and said page include the same number of data locations; and
setting a flag in a flag location that corresponds to each one of said subset of data locations, wherein the flag indicates that DMA write data is present in each one of said subset of data locations.

3. The computer-implemented method of claim 1, further comprising:
maintaining a pool of substitute pages; and
selecting said substitute page from said pool.

4. The computer-implemented method of claim 1, wherein the DMA write fault occurs when said page has been moved out of the virtual memory.

5. The computer-implemented method of claim 1, further comprising:
in response to said current control setting being a first setting, determining that said page is available and writing said DMA data to said page.

6. The computer-implemented method of claim 1, further comprising:
in response to said current control setting being a second setting:
postponing writing said DMA data to said page;
rereading said current control setting that is associated with said page; and
reprocessing said attempt to write DMA data to said page.

7. The computer-implemented method of claim 1, further comprising:
in response to said current control setting being a third setting:
determining that said DMA write fault occurred while processing said attempt;
selecting said substitute page;
updating said particular entry to replace said address of said page in said address field in said particular entry with an address of said substitute page;
rereading said current control setting that is associated with said page; and
reprocessing said attempt to write DMA data to said page.

8. The computer-implemented method of claim 7 further comprising:
in response to updating said particular entry to replace said address of said page in said address field in said particular entry with an address of said substitute page, setting said current control setting to be a fourth setting;
in response to said current control setting being said fourth setting, writing said DMA data to only said subset of data locations in said substitute page; and
setting a flag in all flag locations that correspond to said subset of data locations.

9. The computer-implemented method of claim 1, further comprising:
in response to said current control setting being a fourth setting:
writing said DMA data to only said subset of data locations in said substitute page; and
setting a flag in all flag locations that correspond to said subset of data locations.

10. The computer-implemented method of claim 1, further comprising:
selecting a second substitute page to be a restoration page, wherein the page, the second substitute page, and the restoration page include the same number of data locations;
copying original data from said page to said restoration page;
in response to copying the original data, selecting data that is stored in said subset of data locations that are associated with flag locations that include the flag; and
in response to selecting data, copying said selected data to said restoration page, said selected data being stored in restoration data locations in said restoration page that correspond to said subset of data locations, wherein said selected data overwrites original data that was stored in data locations in said restoration page that correspond to only said subset of data locations, and wherein original data that was stored in data locations in said restoration page that are not associated with flag locations that do not include the flag is not overwritten.

11. The computer program product of claim 2 wherein the program code, which when executed, further performs the action of:
maintaining a pool of substitute pages; and
selecting said substitute page from said pool.

12. The computer program product of claim 2 wherein the DMA write fault occurs when said page has been moved out of the virtual memory.

13. The computer program product of claim 2 wherein the program code, when executed, further performs the action of:
in response to said current control setting being a first setting, determining that said page is available and writing said DMA data to said page.

14. The computer program product of claim 2 wherein the program code, when executed, further performs the action of:
in response to said current control setting being a second setting:
postponing writing said DMA data to said page;
rereading said current control setting that is associated with said page; and
reprocessing said attempt to write DMA data to said page.

15. The computer program product of claim 2 wherein the program code, when executed, further performs the action of:
in response to said current control setting being a third setting:
determining that said DMA write fault occurred while processing said attempt;
selecting said substitute page;
updating said particular entry to replace said address of said page in said address field in said particular entry with an address of said substitute page;
rereading said current control setting that is associated with said page; and
reprocessing said attempt to write DMA data to said page.

16. The computer program product of claim 15 wherein the program code, when executed, further performs the action of:

in response to updating said particular entry to replace said address of said page in said address field in said particular entry with an address of said substitute page, setting said current control setting to be a fourth setting;

in response to said current control setting being said fourth setting, writing said DMA data to only said subset of data locations in said substitute page; and setting a flag in all flag locations that correspond to said subset of data locations.

17. The computer program product of claim 2 wherein the program code, when executed, further performs the action of:

in response to said current control setting being a fourth setting, writing said DMA data to only said subset of data locations in said substitute page; and setting a flag in all flag locations that correspond to said subset of data locations.

18. The computer program product of claim 2 wherein the program code, which when executed, further performs the action of:

selecting a second substitute page to be a restoration page, wherein the page, the second substitute page, and the restoration page include the same number of data locations;

copying original data from said page to said restoration page;

in response to copying the original data, selecting data that is stored in said subset of data locations that are associated with flag locations that include the flag; and in response to selecting data, copying said selected data to said restoration page, said selected data being stored in restoration data locations in said restoration page that correspond to said subset of data locations, wherein said selected data overwrites original data that was stored in data locations in said restoration page that correspond to only said subset of data locations, and wherein original data that was stored in data locations in said restoration page that are not associated with flag locations that do not include the flag is not overwritten.

19. The computer-implemented method according to claim 1, wherein processing said attempt to write DMA data to said page according to said current control setting comprises:

determining whether said current control setting is a first value;

in response to determining that said current control setting is a first value, determining that said page is available and writing said DMA data to said page;

in response to determining that said current control setting is not said first value, determining whether said current control setting is a second value;

in response to determining that said current control setting is said second value:

postponing writing said DMA data to said page;

rereading said current control setting; and reprocessing said attempt to write DMA data to said page;

in response to determining that said current control setting is not said second value, determining whether said current control setting is a third value;

in response to determining that said current control setting is said third value:

determining that said DMA write fault occurred while processing said attempt;

selecting said substitute page;

updating said particular entry to replace said address of said page in said address field in said particular entry with an address of said substitute page;

setting said current control setting to be a fourth value;

rereading said current control setting; and reprocessing said attempt to write DMA data to said page;

in response to determining that said current control setting is not said third value, determining whether said current control setting is said fourth value;

in response to determining that said current control setting is said fourth value:

writing said DMA data to only said subset of data locations in said substitute page; and setting a flag in all flag locations that correspond to said subset of data locations.

20. The computer program product according to claim 2 wherein processing said attempt to write DMA data to said page according to said current control setting comprises:

determining whether said current control setting is a first value;

in response to determining that said current control setting is a first value, determining that said page is available and writing said DMA data to said page;

in response to determining that said current control setting is not said first value, determining whether said current control setting is a second value;

in response to determining that said current control setting is said second value:

postponing writing said DMA data to said page;

rereading said current control setting; and reprocessing said attempt to write DMA data to said page;

in response to determining that said current control setting is not said second value, determining whether said current control setting is a third value;

in response to determining that said current control setting is said third value:

determining that said DMA write fault occurred while processing said attempt;

selecting said substitute page;

updating said particular entry to replace said address of said page in said address field in said particular entry with an address of said substitute page;

setting said current control setting to be a fourth value;

rereading said current control setting; and reprocessing said attempt to write DMA data to said page;

in response to determining that said current control setting is not said third value, determining whether said current control setting is said fourth value;

in response to determining that said current control setting is said fourth value:

writing said DMA data to only said subset of data locations in said substitute page; and setting a flag in all flag locations that correspond to said subset of data locations.

* * * * *